(12) United States Patent
Hofmann

(10) Patent No.: US 11,440,148 B2
(45) Date of Patent: Sep. 13, 2022

(54) CENTERING CONE AND CLAMPING DEVICE

(71) Applicant: Zeroclamp GmbH, Bruckmühl (DE)

(72) Inventor: Klaus Hofmann, Bruck (DE)

(73) Assignee: ZEROCLAMP GMBH, Bruckmühl (DE)

( * ) Notice: Subject to any disclaimer, the term of this patent is extended or adjusted under 35 U.S.C. 154(b) by 205 days.

(21) Appl. No.: 16/643,014

(22) PCT Filed: Aug. 9, 2018

(86) PCT No.: PCT/DE2018/100701
§ 371 (c)(1),
(2) Date: Feb. 28, 2020

(87) PCT Pub. No.: WO2019/042493
PCT Pub. Date: Mar. 7, 2019

(65) Prior Publication Data
US 2020/0306902 A1    Oct. 1, 2020

(30) Foreign Application Priority Data
Aug. 29, 2017    (DE) .................. 102017119822.9

(51) Int. Cl.
*B23Q 1/00*    (2006.01)
*B23Q 3/18*    (2006.01)
(52) U.S. Cl.
CPC ........... *B23Q 1/0072* (2013.01); *B23Q 3/183* (2013.01)
(58) Field of Classification Search
CPC ............. B23B 2260/114; B23B 31/006; B23B 31/117; B23B 31/1175; B23B 31/1177; B23Q 3/102; B25H 1/08; F16C 27/06; F16C 33/74; F16F 1/3732; F16F 1/374; F16F 1/426; F16F 1/445; F16F 1/545;
(Continued)

(56) References Cited

U.S. PATENT DOCUMENTS 2,630,343 A * 3/1953 Jones .................. F16J 15/3208
277/555
4,151,767 A    5/1979 Szush
(Continued)

FOREIGN PATENT DOCUMENTS

DE    19961451 A1 *  6/2001 ........... B23B 31/006
EP    1044760 A2    10/2000
(Continued)

OTHER PUBLICATIONS

Machine Translation of DE 19961451. https://worldwide.espacenet.com/patent/search/family/007933422/publication/DE19961451A1?q=DE19961451A1 (Year: 2022).*
(Continued)

*Primary Examiner* — Tyrone V Hall, Jr.
(74) *Attorney, Agent, or Firm* — The Culbertson Group, P.C.

(57) ABSTRACT

A centering cone for positioning a fastening element in a receptacle of a clamping device. The centering cone has an internally located cone section with a cone-shaped inner surface to which a one-piece spring section is connected in a radial direction. The spring section is configured to deform slightly under a radially applied force to provide a certain tolerance for receiving the fastening element.

12 Claims, 3 Drawing Sheets

(58) Field of Classification Search
CPC ...... F16J 15/32; F16J 15/3208; F16J 15/3232; Y10T 16/05; Y10T 16/063; Y10T 403/454; Y10T 403/7061
See application file for complete search history.

(56) References Cited

U.S. PATENT DOCUMENTS

| 8,123,233 | B2 | 2/2012 | Hofmann |
| 2008/0217872 | A1 | 9/2008 | Hofmann |
| 2015/0209870 | A1 | 7/2015 | Haimer |

FOREIGN PATENT DOCUMENTS

| EP | 2829355 A1 | 1/2015 |
| FR | 2613970 A1 | 10/1988 |
| GB | 2205058 A | 11/1988 |
| JP | 2011251376 A | 12/2011 |
| WO | 2016116346 A2 | 7/2016 |

OTHER PUBLICATIONS

CN 201880054707.7 China Office action dated Apr. 25, 2021.
PCT/DE2018/100701 International Preliminary Report on Patentability, dated Mar. 12, 2020.

\* cited by examiner

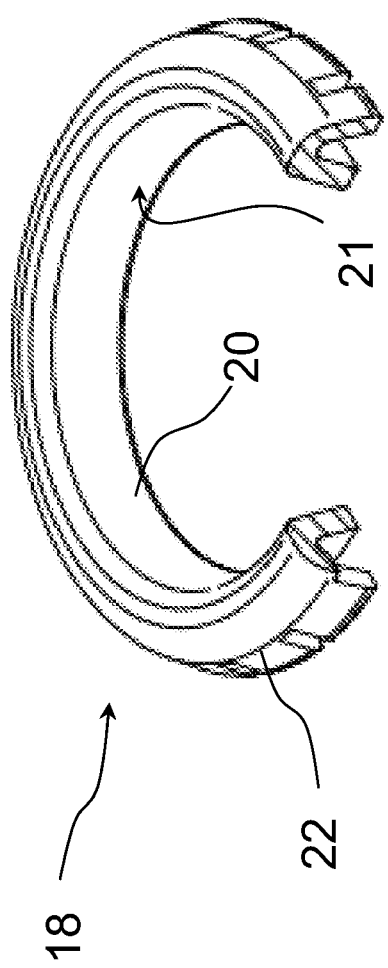
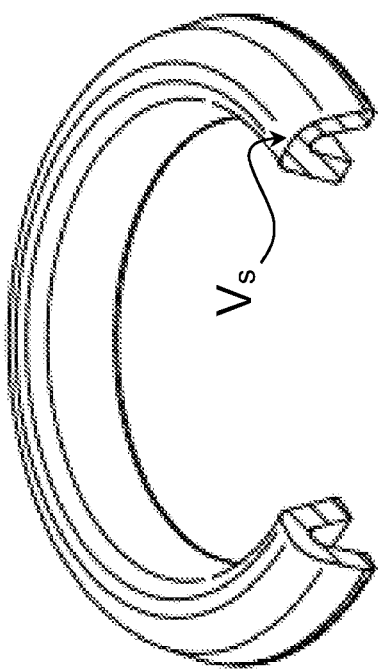
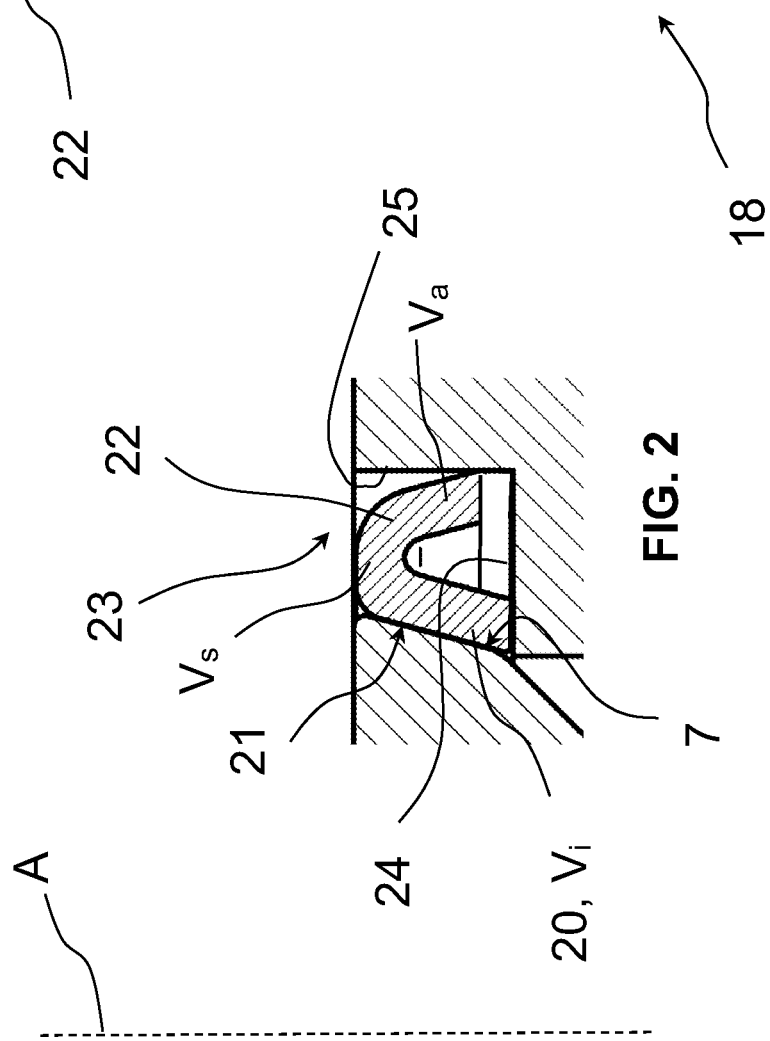
FIG. 3
FIG. 4
FIG. 2

CENTERING CONE AND CLAMPING DEVICE

TECHNICAL FIELD OF THE INVENTION

The present invention relates to a centering cone and a clamping device including said cone particularly for use in tooling machines.

BACKGROUND OF THE INVENTION

Clamping devices are known from the area of tooling machines in which one fastening element can be temporarily attached or clamped in a receptacle by using a clamping element associated with the receptacle. Such systems, as they are known for example from WO 2007/009439, are characterized by high positioning precision and are used in particular for temporarily attaching a workpiece to the machine bed of a tooling machine for a processing pass.

Frequently, several fastening elements together hold one or more workpieces. This can be done by using a base plate equipped with several fastening elements on the bottom and equipped to accept one or more workpieces on the top. The preferably bolt-like fastening elements are connected together rigidly with the base plate. The base plate is placed on the machine bed in which each fastening element is inserted in a suitable receptacle in the machine bed and clamped there.

In case of temperature fluctuations in the base plate, it expands or contracts, with the result that the spacing between the fastening elements attached to it can change slightly. In order to still be able to securely fasten the base plates on the machine bed, the fastening elements for the accepting receptacles—as described in WO 2007/009439—are equipped with a centering cone that is mounted in a floating position relative to the receptacle. As a result, every fastening element can be moved within its receptacle by a small degree in a direction transverse to its longitudinal axis, wherein this movement acts against a separately made spring element, which is mounted so that it may float or move somewhat around the exterior of the centering cone. This arrangement of the centering cone and the separate spring element is complicated to manufacture and accordingly expensive.

SUMMARY OF THE INVENTION

An object of the present invention is to provide a centering cone for a clamping device which overcomes the disadvantages discussed above.

According to various aspects of the present invention a centering cone is formed in one piece while still providing a dual function. The one-piece construction allows a centering cone according to the present invention to be completed more quickly and more economically. The dual function results from the centering cone having an inner cone section with a cone-shaped internal surface which is formed for contact with a conical exterior surface of a fastener in a complimentary shape. The exterior side of the centering cone comprises a spring section formed in one piece with the cone section, which connects in a radial direction to the outside of the cone section in order to apply radially inward, resetting spring force to the cone section. The centering cone according to the invention—unlike the prior art—permits the combination of a cone section with a spring section in a one-piece combination having the desired size. A necessary consideration known from the prior art regarding manufacturing tolerances of the separately formed elements and their separate positioning in a receptacle on the clamping device can be omitted, saving time and money.

A clamping device holding a centering cone according to the invention comprises at least one receptacle in which a fastening element is temporarily placed and fastened. The receptacle, just like the fastening element, may be formed rotationally symmetrical to a longitudinal axis, completely or at least in a section. At least one clamping element movable or slideable in a radial direction can optionally apply a clamping force to the fastening element placed in the receptacle so as to clamp the fastening element in place. A conical exterior surface is formed on the fastening element, which contacts the centering cone according to the invention to center the fastening element in the receptacle.

The centering cone is formed in a ring shape with a cone axis which coincides with the longitudinal axis of the fastening element in the clamped state. On the centering cone an inner cone section surrounds the cone axis, which is formed in a shape complimentary to the cone exterior in order to interact with it and to be able to exert a radial positioning force on the fastening element.

According to the invention the spring section is located in a radial direction to the outside of the cone section and is formed in one piece with the cone section. The spring section is used to exert a spring force in a radial direction to the inside on the cone section which in turn presses against the fastening element in order to determine the radial position of the fastening element within the receptacle and at the same time to realize its floating position with which the lateral position of the fastening element can vary relative to the receptacle by a small degree. To absorb the spring force the centering cone can, for example, be supported on its outer circumference or on a wall of the receptacle.

An advantageous embodiment of the invention provides that the cone section is relatively more rigid than the spring section. The cone section is therefore largely stable in form, so that a fastening element placed on the cone-shaped inner surface of the cone section cannot deform the cone section when it applies radial or axial force to it. The spring section, on the other hand, is formed so as to be more flexible in comparison with the cone section such that the cone section is slightly moveable relative to the spring section in a radial direction in order to compensate for the above-described variations in the positioning of fastening elements which result from thermal causes in particular. The desired relative mobility of the cone section compared with the spring section is in the range of hundredths of millimeters, preferably in the range of 0.05 mm.

For this purpose, the spring section is durable and elastically flexible under the forces encountered in a clamping device in accordance with the invention. A radial impact to the cone section relative to the spring section then results in the deformation of the spring section which dissipates with the recovery of the centering cone to its original form.

An advantageous embodiment of the invention provides that the cone section and spring section form essentially a V-shape. The cone section is thereby formed by the inner V-leg (that is, inner leg of the V shape) in the radial direction, while the spring section is formed at the minimum with the externally located V-leg (external leg of the V-shape) in the radial direction. The peak that connects both legs of the V-cross-section can optionally be part of the cone section or the spring section. The V-shaped form allows for the one-piece shape of the cone section with the spring section in a simple way and with comparable little space, wherein the V-shaped cross-section favors the formation of a spring effect. In this V-shaped cross-section, the internal cone section forms a ring with the inner and outer surfaces angled toward the cone axis. The spring section likewise has a ring shape surrounding the cone axis, with an angle of its inner and outer surfaces opposite that of the cone section.

In an embodiment of a V-shaped centering cone in accordance with the invention, the inner leg formed by the cone section in an axial direction may be longer than the outer leg. This lets the cone section slide ("float") better in the receptacle along a contact surface of the receptacle which runs perpendicular to the longitudinal axis of the receptacle. The outer leg of the centering cone in an axial direction of somewhat shorter form expediently does not touch this contact surface. As a result, an undefined deformation behavior and in particular a "wandering" of the centering cone in an axial direction is avoided when the cone section is repeatedly loaded and unloaded in a radial direction.

For this purpose, the free end of the inner and/or outer leg is bounded in an axial direction by a front surface parallel to the cone axis. The longer, preferably the internal, leg is positioned flat with its axial end surface (and thereby in a defined axial position) on the previously mentioned contact surface of the receptacle. The external leg of the V-shaped cross-section formed by the spring section does not touch the contact surface in the case of a shorter design, however, and instead is in contact with an external wall of the receptacle that supports the centering cone in a radial direction to the inside.

In an alternative form according to the invention, the centering cone has a more of a U-shaped cross-section, so that the internal leg formed by the cone section and the external leg formed by the spring section extend parallel to each other at least in part. The spring section is preferably made thinner (and therefore more flexible) than the cone section.

In an advantageous embodiment of the U-shaped alternative, the internal leg formed by the cone section extends from its free end in an axial direction by a slight degree over the axial position of the peak to a second end. Here the second end is provided to allow the cone section to slide ("float") better along a contact surface of the receptacle which runs perpendicular to the axis of the receptacle (see FIG. 5).

The V-shaped or U-shaped design of the centering cone can be chosen such that the free end of the cone section coincides with the small external diameter of the fastening element cone and the large external diameter of the fastening element cone in an axial direction lies more at the height of the peak (see FIG. 2).

Conversely, the peak can also be at the height of the small diameter of the fastening element cone such that the internal surface of the free leg of the cone section extending from the peak is angled radially to the outside (see FIG. 5).

The U-shaped design of the centering cone offers improved protection from too much radial deformation of the centering cone because, compared with the broader peak of the V-shaped variation, it hits more on the wall of the receptacle supporting the spring section when the movement is radial to the outside.

Preferably, the free end of the external leg is additionally bounded by a cylinder jacket surface surrounding the cone axis. With this external surface, the centering cone can be placed flush with the previously mentioned wall on the inside of a radial extension formed in the receptacle in order to be able to establish the desired spring force in the radial direction. The external surface of the external leg forming the cylinder jacket is used in this case to guide the centering cone toward a tilt, for instance when the centering cone is used or slid in during the assembly of a clamping device in an axial direction in a step-shaped extension of the receptacle.

To form the desired spring properties of the centering cone, an advantageous embodiment provides for a cone section that has a greater wall thickness in cross-section than the spring section. Thus the desired spring properties can already be achieved by the part of the centering cone adjacent to the cone section in a radial direction to the outside being made with entirely or partly lesser wall thickness and therefore with less stiffness compared to the cone section. In principle, the wall thickness of the centering cone is arbitrarily selectable as long as the desired greater thickness of the cone section compared with the spring section is ensured.

The spring properties of the spring section can also be achieved, for example, by weakening the outer leg in a radial direction by introducing one or more surrounding grooves, notches, or recesses in order to create a slight deformability or greater elasticity with reduced material in some places. Notches or cuts also offer sufficient play for a slight approximation of the adjacent area of the spring section in the peripheral direction if it is inwardly deformed in a radial direction.

Depending on the material used for the centering cone, especially with a V-shaped cross-section of the cone section with the spring section, the required spring stiffness alone can result from the V-shape when the peak of the section takes on the temporary deformation without needing to have wall thicknesses different from that of the adjacent inner leg in a radial direction (the cone section) or the radially external adjacent external leg.

The invention is additionally concerned with a clamping device with at least one centering cone of the type previously described. The clamping device includes a receptacle that is preferably rotationally symmetrical to a receptacle axis for clamping a fastening element wherein the fastening element has a conical external surface for contacting the cone-shaped internal surface of the centering cone. Additionally, a radial extension in the form of a step is provided in the receptacle which includes a contact surface transverse to the receptacle axis wherein the centering cone is arranged by placing it on the contact surface in the extension. The contact surface serves to guide the centering cone "floating" for slight movement in a radial direction wherein preferably the cone section rests on the contact surface and therefore supported in an axial direction.

Although the centering cone in accordance with the invention preferably has a V-shaped of U-shaped partial cross-section, other embodiments are also conceivable in which a relatively stable form and fixed inner section is used to attach the cone surface of the fastening element while a spring section is connected in a radial direction to the outside. "In a radial direction to the outside" includes the case in which the spring section is placed in a radial direction outside of the cone section however in an axial direction above and below.

These and other advantages and features of the invention will be apparent from the following description of representative embodiments, considered along with the accompanying drawings.

BRIEF DESCRIPTION OF THE DRAWINGS

FIG. 2 is an enlarged section view showing a portion of the centering cone shown in FIG. 1.

FIG. 3 shows a first variation of a centering cone in accordance with the invention.

FIG. 4 shows a second variation of a centering cone in accordance with the invention.

DESCRIPTION OF REPRESENTATIVE EMBODIMENTS

Figure 1:
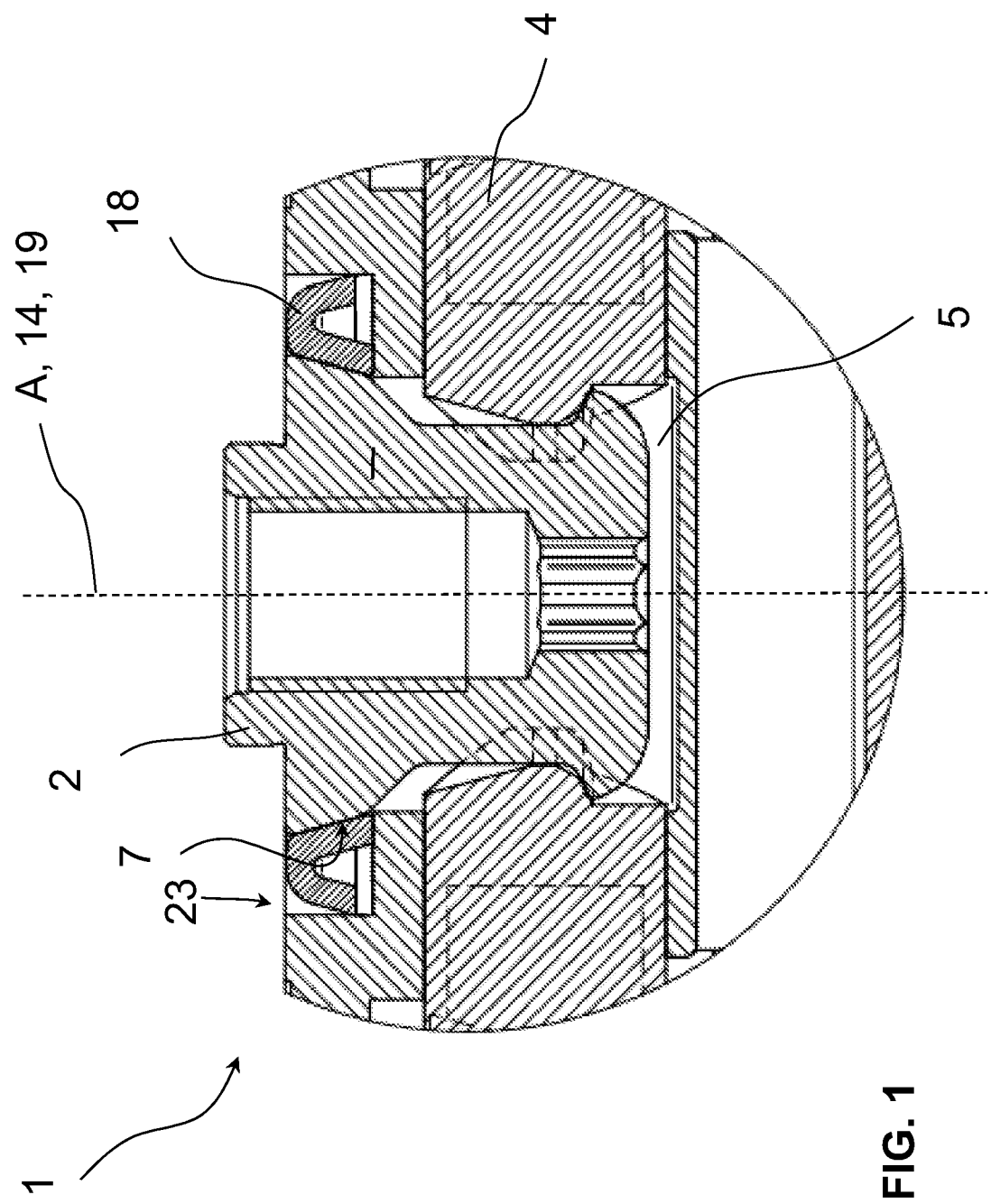
FIG. 1 is a view in section of a clamping device with a centering cone in accordance with the invention.

FIG. 1 shows a clamping device 1 in simplified sectional view. Clamping device 1 is intended for accepting a fastening element 2 with longitudinal axis 14 wherefore fastening element 2 can be inserted in receptacle 5 on clamping device 1 which extends along receptacle axis A.

In the inserted condition of the fastening element 2, several clamping elements 4 push from behind a fastening element edge not described in greater detail whereby the fastening element 2 is held in its inserted position. Clamping elements 4 may be retracted radially to the outside to thereby release the fastening element 2 so that it can be removed from receptacle 5. On an upper section of the fastening element 2, a cone shaped exterior surface 7 is provided in order to interact with a centering cone in accordance with the invention.

Centering cone 18 is formed around cone axis 19 which coincides with longitudinal axis 14 when the fastening element is in the clamped condition. The ring-shaped centering cone section 18 shows in a cross-section passing through its cone axis 19 two roughly V-shaped individual cross-sections that, because of symmetry through the cone axis 19, lie across from each other. A single one of these cross-sections can be seen in FIG. 2 in an enlarged partial view.

Centering cone 18 includes in this somewhat V-shaped cross-section a cone section 20 with a cone-shaped inner surface 21 for contacting the conical exterior surface 7 of fastening element 2 when the fastening element is in the clamped position shown best in FIG. 1. At the same time cone section 20 represents the inner leg $V_i$ of the V shape. The peak $V_s$ of the V shape located at the upper end of the cross-section in the orientation of the figures provides a connection in a radial direction to an external leg $V_a$ of the V-shape. The internal leg $V_i$ and the external leg $V_a$ run with an angle inverted to each other relative to the cone axis A.

Spring section 22 connected in a radial direction to cone section 20 is formed in the variation shown in FIG. 2 by the peak $V_s$ and the external leg $V_a$, in which one or both of peak $V_s$ and $V_a$ has greater deformability or elasticity than cone section 20 which is formed by the inner leg $V_i$. Because of its spring properties, spring section 22 can be reversibly (that is, elastically) deformed in a radial direction such that the free ends of both legs $V_i$, $V_a$ can be moved slightly toward each other or away from each other. A force directed radially to the inside on spring section 22 contacts cone section 20 accordingly in the same direction such that its cone-shaped internal surface 21 is pressed to the inside against the conical external surface 7 of the fastening element 2 when the fastening element is in the clamped position.

FIG. 2 shows the partial cross-section of the centering cone 18 when inserted into an operating position in clamping device 1 according to FIG. 1. The centering cone 18 sits in a radial extension 23 in the form of a step, wherein the step is formed about receptacle axis A and includes a cylinder shaped inside surface 25 running parallel to receptacle axis A and a contact surface 24 running transverse to receptacle axis A. In the operating position, centering cone 18 with an axial, lower end is placed flat on contact surface 24, whereby it is slightly moveable toward the inside or outside under the influence of radial forces ("floating mount") by virtue of the elastic deformation available from spring section 22.

External leg $V_a$ of centering cone 18 is made somewhat shorter than the inner leg $V_i$ in the axial direction such that external leg $V_a$ does not touch contact surface 24. Instead, external leg $V_a$ is placed with its external circumference on the inside surface 25 of step-shaped extension 23 in order to accept a spring force built up or transferred in a radial direction in the centering cone 18.

The functionality of the centering cone according to the invention can be explained based on FIG. 1 as follows. With fastening element 2 still removed, centering cone 18 is inserted in extension 23 of receptacle 5 to an operating position, wherein it is preferably custom-fit or inserted under radial pretension in the surrounding inside surface 25. Fastening element 2 can then be inserted with retracted clamping elements 4 in an axial direction in receptacle 5. With the subsequent radial movement of clamping element 4 to the inside, the pretension running at a slant engages fastening element 2 from behind on the lower end of fastening element 2, whereby the fastening element is pulled slightly downward (in the orientation of the drawing) in an axial direction during the clamping process and thereby is inserted in the clamped position with its conical external surface 7 in a form fit in the complementary formed conical internal surface 21 of centering cone 18.

With the form fit attachment of conical external surface 7 of fastening element 2 to conical internal surface 21 of centering cone 18, a floating position of fastening element is created on contact surface 24 such that fastening element 2 is slightly moveable in a radial direction along contact surface 24. At the same time, the prevalent spring force effective in a radial direction in centering cone 18 causes fastening element 2 to be oriented as concentric as possible to cone axis 19 or to receptacle axis A, or to move from a position that varies from that. Because clamping element 4 does not also necessarily or exactly specify the radial end position of fastening element 2, fastening element 2 can take its position within certain radial tolerances as part of the clamping process. In cases where several fastening elements 2 are rigidly connected together and are each received in a respective clamping device 1, the radial tolerance provided by the clamping device accommodates the effects of thermal expansion which slightly changes the position of the fastening elements relative to each other. The result of such a variation in relative position can be that axis 14 of the given clamped fastening element 2 deviates slightly from receptacle axis A. The spring effect from the centering cone 18 ensures that this deviation is as small as possible.

FIG. 3 shows an embodiment of centering cone 18 for which the externally located leg $V_a$ is slit along the circumference, whereby the spring properties are further improved. Depending on the form of the wall thickness of both leg $V_i$ and $V_a$ or of the peak $V_s$, a variation according to FIG. 4 is conceivable in which these slits are omitted.

Figure 5:
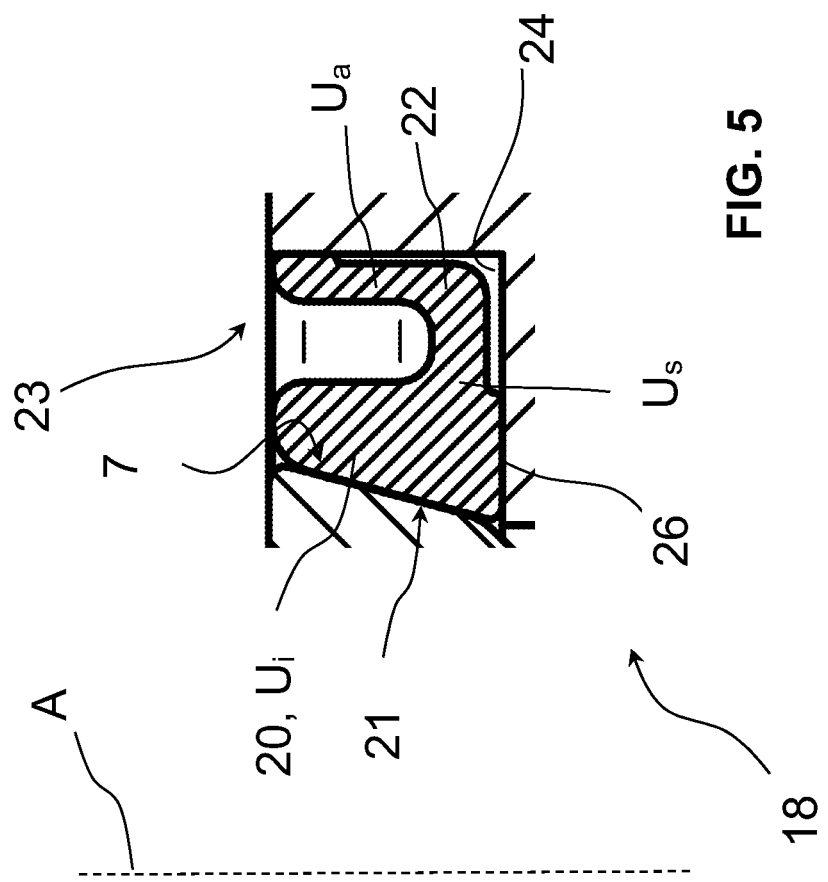
FIG. 5 is a section view of an alternative embodiment of a centering cone in accordance with the invention.

FIG. 5 shows another beneficial embodiment of a centering cone in accordance with the invention in simplified form, wherein the repetition of similar reference number is omitted. Centering cone 18 in the embodiment of FIG. 5 has a more U-shaped design, wherein again the external leg $U_a$ forms the spring section 22 while the internal leg $U_i$ represents cone section 20 here. Both legs ($U_i$ and $U_a$) run largely parallel to each other with the exception of the radial inwardly facing surface 21 of cone section 20 which is formed for contacting along the conical external surface 7 of fastening element 2.

Peak $U_s$, unlike the variations in FIGS. 1-4, is placed in an axial direction more on the height of the smallest internal diameter of centering cone 18. In addition, the inner leg $U_i$, viewed from its free end (upper end in the orientation of the figure), extends in an axial direction by a slight degree over the axial position of the peak to a second end 26. This end 26 lies flat on the contact surface 24 in order to allow the cone section 20 to glide better along this surface ("float").

Also, with this variation the external leg $U_a$ is placed with a cylinder-shaped circumferential surface on its free end on the inside 25 of the step-shaped extension 23 in order to compensate for a spring force built up in centering cone 18 or transferred in a radial direction.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A centering cone for use in a clamping device having a receptacle and a clamping element associated with the receptacle, wherein the receptacle is adapted to receive an elongated fastening element and the clamping element is adapted to clamp the elongated fastening element in a clamped position in the receptacle, the centering cone including:
   (a) a cone section defining a cone axis, the cone section being ring-shaped and including a cone-shaped internal surface;
   (b) a spring section which is formed with the cone section in one piece and is located radially outwardly from the cone axis relative to the cone section;
   (c) wherein the cone section and spring section together have an approximately U-shaped or V-shaped cross-section, with the cone section comprising an inner leg of the U or V shape in a radial direction from the cone axis, the spring section comprising an outer leg of the U or V shape in the radial direction from the cone axis, and the inner leg of the U or V shape being longer than the outer leg of the U or V shape in the direction of the cone axis; and
   (d) wherein the cone section and spring section are adapted to be received in an operating position within the receptacle with the cone axis substantially aligning with an axis of the receptacle, and wherein in this operating position the spring section is adapted to apply a radial positioning force on the cone section in a radial direction toward the cone axis when the fastening element is in the clamped position in the receptacle, the cone section thereby defining a floating position for the fastening element in the receptacle.

2. The centering cone of claim 1 wherein the cone section is relatively more rigid than the spring section.

3. The centering cone of claim 1 wherein the spring section is elastically deformed when applying the radial positioning force to the cone section.

4. The centering cone of claim 1 wherein that cone section has a wall thickness in the radial direction from the cone axis that is greater than a wall thickness of the spring section in the radial direction from the cone axis.

5. The centering cone of claim 1, wherein a peak of the U or V shape lies in the axial direction along the cone axis at a location of the largest internal diameter of the cone section along the cone axis.

6. The centering cone of claim 1 wherein the cone section and spring section together have approximately a U-shaped cross-section and wherein a peak of the U shape lies in the axial direction along the cone axis at a location of the smallest internal diameter of the cone section along the cone axis.

7. A clamping device for use in clamping an elongated fastening element in a clamped position, the clamping device including:
   (a) a receptacle adapted to receive the elongated fastening element therein when the elongated fastening element is in the clamped position;
   (b) a clamping element associated with the receptacle, the clamping element being adapted to clamp the elongated fastening element to retain the elongated fastening element in the clamped position;
   (c) a centering cone including (i) a cone section defining a cone axis, the cone section being ring-shaped and including a cone-shaped internal surface, and (ii) a spring section which is formed with the cone section in one piece and is located radially outwardly from the cone axis relative to the cone section;
   (d) wherein the cone section and spring section together have an approximately U-shaped or V-shaped cross-section, with the cone section comprising an inner leg of the U or V shape in a radial direction from the cone axis, the spring section comprising an outer leg of the U or V shape in the radial direction from the cone axis, and the inner leg of the U or V shape being longer than the outer leg of the U or V shape in the direction of the cone axis; and (e) wherein the centering cone is received in an operating position within the receptacle with the cone axis substantially aligning with a receptacle axis, and wherein in this operating position the spring section is adapted to apply a radial positioning force to the cone section in a radial direction toward the cone axis when the fastening element is in the clamped position in the receptacle, the cone section thereby defining a floating position for the fastening element in the receptacle.

8. The clamping device claim 7 wherein:

(a) the receptacle is rotationally symmetrical to the receptacle axis;

(b) the centering cone is positioned in the receptacle such that a portion of the cone-shaped internal surface contacts a portion of a conical external surface of the fastening element when the fastening element is in the clamped position;

(c) the receptacle includes a radial extension forming a step which includes a contact surface extending transverse to the receptacle axis; and (d) the centering cone when received in the operating position within the receptacle resides in contact with the contact surface.

9. The clamping device of claim 8 wherein the radial extension is bounded in a radial direction from the receptacle axis by a wall which resides in contact with an outermost part of the spring section when the centering cone is received in the operating position.

10. The clamping device of claim 8 wherein at least the cone section is mounted in a floating position relative to the receptacle when the centering cone is received in the operating position.

11. The clamping device of claim 8 wherein a depth of the radial extension in a direction parallel to the receptacle axis is no less than an axial length of the centering cone so that the centering cone received in the operating position resides entirely within a volume of the radial extension.

12. The clamping device of claim 7 wherein:

(a) a free end of the inner leg of the U or V shape is bounded by a contact surface of the receptacle when the cone section and spring section are in the operating position within the receptacle, the contact surface extending perpendicular to the cone axis; and (b) a free end of the outer leg of the U or V shape is bounded in the radial direction from the cone axis by a cylinder surface of the receptacle, the cylinder surface defining a cylindrical shape about the cone axis.

* * * * *